United States Patent
Chen et al.

(10) Patent No.: US 11,522,881 B2
(45) Date of Patent: Dec. 6, 2022

(54) STRUCTURAL GRAPH NEURAL NETWORKS FOR SUSPICIOUS EVENT DETECTION

(71) Applicant: NEC Laboratories America, Inc., Princeton, NJ (US)

(72) Inventors: Zhengzhang Chen, Princeton Junction, NJ (US); Jiaping Gui, West Windsor Township, NJ (US); Haifeng Chen, West Windsor, NJ (US); Lei Cai, College Station, TX (US)

(73) Assignee: NEC Corporation

( * ) Notice: Subject to any disclaimer, the term of this patent is extended or adjusted under 35 U.S.C. 154(b) by 310 days.

(21) Appl. No.: 16/992,395

(22) Filed: Aug. 13, 2020

(65) Prior Publication Data
US 2021/0067527 A1    Mar. 4, 2021

Related U.S. Application Data

(60) Provisional application No. 62/892,703, filed on Aug. 28, 2019.

(51) Int. Cl.
*H04L 9/40* (2022.01)
*G06N 3/08* (2006.01)

(52) U.S. Cl.
CPC .......... *H04L 63/1416* (2013.01); *G06N 3/08* (2013.01)

(58) Field of Classification Search
CPC .............................. H04L 63/1416; G06N 3/08
See application file for complete search history.

(56) References Cited

U.S. PATENT DOCUMENTS

| | | | |
|---|---|---|---|
| 10,484,402 B2* | 11/2019 | El-Moussa | G06F 21/55 |
| 10,511,613 B2* | 12/2019 | Chen | H04L 41/22 |
| 10,599,550 B2* | 3/2020 | Walters | G06F 16/335 |
| 10,685,293 B1* | 6/2020 | Heimann | G06N 20/00 |
| 10,810,210 B2* | 10/2020 | Choudhury | G06F 16/2379 |
| 11,363,028 B2* | 6/2022 | Malliah | H04L 63/20 |
| 2020/0012626 A1* | 1/2020 | Walters | G06N 7/005 |
| 2020/0089652 A1* | 3/2020 | Jayaraman | G06F 16/9017 |
| 2022/0210065 A1* | 6/2022 | Khanna | H04L 45/74 |

OTHER PUBLICATIONS

Eswaran et al., "SEDANSPOT: Detecting Anomalies in Edge Streams", 2018 IEEE International Conference on Data Mining, Nov. 2018, pp. 953-958.

(Continued)

*Primary Examiner* — Viral S Lakhia
(74) *Attorney, Agent, or Firm* — Joseph Kolodka (57) ABSTRACT

A computer-implemented method for graph structure based anomaly detection on a dynamic graph is provided. The method includes detecting anomalous edges in the dynamic graph by learning graph structure changes in the dynamic graph with respect to target edges to be evaluated in a given time window repeatedly applied to the dynamic graph. The target edges correspond to particular different timestamps. The method further includes predicting a category of each of the target edges as being one of anomalous and non-anomalous based on the graph structure changes. The method also includes controlling a hardware based device to avoid an impending failure responsive to the category of at least one of the target edges.

16 Claims, 8 Drawing Sheets

(56) References Cited

OTHER PUBLICATIONS

Goyal, et al., "dyngraph2vec: Capturing Network Dynamics using Dynamic Graph Representation Learning", arXiv:1809.02657v2 [cs SI] Jul. 2, 2019, pp. 1-2.

Grover, et al.,"node2vec: Scalable Feature Learning for Networks", In Proceedings of the 22nd ACM SIGKDD, International Conference on Knowledge Discovery and Data Mining, Aug. 2016, pp. 855-864.

Yu, et al., Netwalk: A Flexible Deep Embedding Approach for Anomaly Detection in Dynamic Networks. In Proceedings of the 24th ACM SIGKDD International Conference on Knowledge Discovery & Data Mining, Aug. 2018, pp. 2672-2681.

Zheng et al., "AddGraph: Anomaly Detection in Dynamic Graph Using Attention-based Temporal GCN", In Proceedings of the Twenty-Eighth International Joint Conference on Artificial Intelligence,IJCAI-19, Aug. 2019, pp. 4419-4425.

\* cited by examiner

Input: $\{G(t) = \{V(t), E(t)\}\}_{i=1}^{n}$, window size w,
1: Inject anomalous edges if required
2: Extract the subgraphs based on definition 2.
3: Generate the label for each node in the subgraph using equation (1)
4: Extract the graph structure feature
5: Model the temporal information using GRU
6: Train the classifier using equation (8)

STRUCTURAL GRAPH NEURAL NETWORKS FOR SUSPICIOUS EVENT DETECTION

RELATED APPLICATION INFORMATION

This application claims priority to U.S. Provisional Patent Application No. 62/892,703, filed on Aug. 28, 2019, incorporated herein by reference herein its entirety.

BACKGROUND

Technical Field

The present invention relates to artificial intelligence and more particularly to structural graph neural networks for suspicious event detection.

Description of the Related Art

Many traditional machine learning methods have been proposed to tackle anomaly detection tasks. Anomaly detection is more challenging in a graph setting due to the complexity of the data and variations in the graph structure. Compared with the anomaly detection in statistic graphs, dynamic graphs are more complex and challenging in two perspectives. First, the anomalous edges cannot be determined by the graph from a single timestamp. The detection procedure must take graphs from the previous graph into consideration. Secondly, the vertical sets are changed along all timestamps.

SUMMARY

According to aspects of the present invention, a computer-implemented method for graph structure based anomaly detection on a dynamic graph is provided. The method includes detecting anomalous edges in the dynamic graph by learning graph structure changes in the dynamic graph with respect to target edges to be evaluated in a given time window repeatedly applied to the dynamic graph. The target edges correspond to particular different timestamps. The method further includes predicting a category of each of the target edges as being one of anomalous and non-anomalous based on the graph structure changes. The method also includes controlling a hardware based device to avoid an impending failure responsive to the category of at least one of the target edges.

According to other aspects of the present invention, a computer program product for graph structure based anomaly detection on a dynamic graph is provided. The computer program product includes a non-transitory computer readable storage medium having program instructions embodied therewith. The program instructions are executable by a computer to cause the computer to perform a method. The method includes detecting anomalous edges in the dynamic graph by learning graph structure changes in the dynamic graph with respect to target edges to be evaluated in a given time window repeatedly applied to the dynamic graph. The target edges correspond to particular different timestamps. The method further includes predicting a category of each of the target edges as being one of anomalous and non-anomalous based on the graph structure changes. The method also includes controlling a hardware based device to avoid an impending failure responsive to the category of at least one of the target edges.

According to yet other aspects of the present invention, a computer processing system for graph structure based anomaly detection on a dynamic graph is provided. The computer processing system includes a memory configured to store program code. The computer processing system further includes a hardware processor operatively coupled to the memory for running the program code to detect anomalous edges in the dynamic graph by learning graph structure changes in the dynamic graph with respect to target edges to be evaluated in a given time window repeatedly applied to the dynamic graph. The target edges correspond to particular different timestamps. The hardware processor further runs the program code to predict a category of each of the target edges as being one of anomalous and non-anomalous based on the graph structure changes. The hardware processor also runs the program code to control a hardware based device to avoid an impending failure responsive to the category of at least one of the target edges.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with embodiments of the present invention, systems and methods are provided for structural graph neural networks for suspicious event detection.

Embodiments of the present invention are particularly suited to dynamic graphs. A dynamic graph is a graph in which the size and volume dynamically change along a time axis.

To tackle these challenges in dynamic graph anomalous edge detection, a structural graph neural network framework is proposed. A main idea of detecting anomalous edges in dynamic graphs is to learn changing structure centered on the target edge to be detected in a given time window and determine the category of the target edge based on the changing structure.

Compared with anomaly detection in statistic graphs, dynamic graphs are complex and challenging in at least the following two perspectives. First, the anomalous edges cannot be determined by the graph from a single timestamp. The detection procedure must take graphs from the previous graph into consideration. Secondly, the vertical sets are changed along all timestamps.

To tackle these challenges in dynamic graph anomalous edge detection, a structural graph neural network framework is proposed. A idea behind detecting anomalous edges in dynamic graphs in accordance with the present invention is to learn the structure changing centered on the target edge to be detected in a given time window and determine the category of the target edge based on the structure changing. An anomalous edge detection framework in accordance with the present invention includes the following three components: subgraph structure generation; a graph structure feature extraction network; and a detection network.

The first step in the proposed framework is to generate the structure graph for the target edge to be detected in a time window with a length of w. Since the detection is most relevant to the local subgraph, an h-hop enclosing subgraph centered on each target edge is employed to enable the computation to be more efficient. In addition, the h-hop enclosing subgraph can help alleviate the effects of noisy data.

The subgraph structure generation element can generate an enclosing subgraph for each timestamp in the detection window. The graph structure feature extraction network takes these subgraphs as input and generates fixed-size feature for each graph. Since the anomalous edges are determined by considering historical graphs, recurrent neural networks are employed to capture the temporal information. The recurrent neural networks take the graph structure feature from the current timestamp and temporal feature from the previous timestamp as input and generates the temporal feature. The temporal feature from the last timestamp is employed to predict anomalous edges using another neural network.

Figure 1:
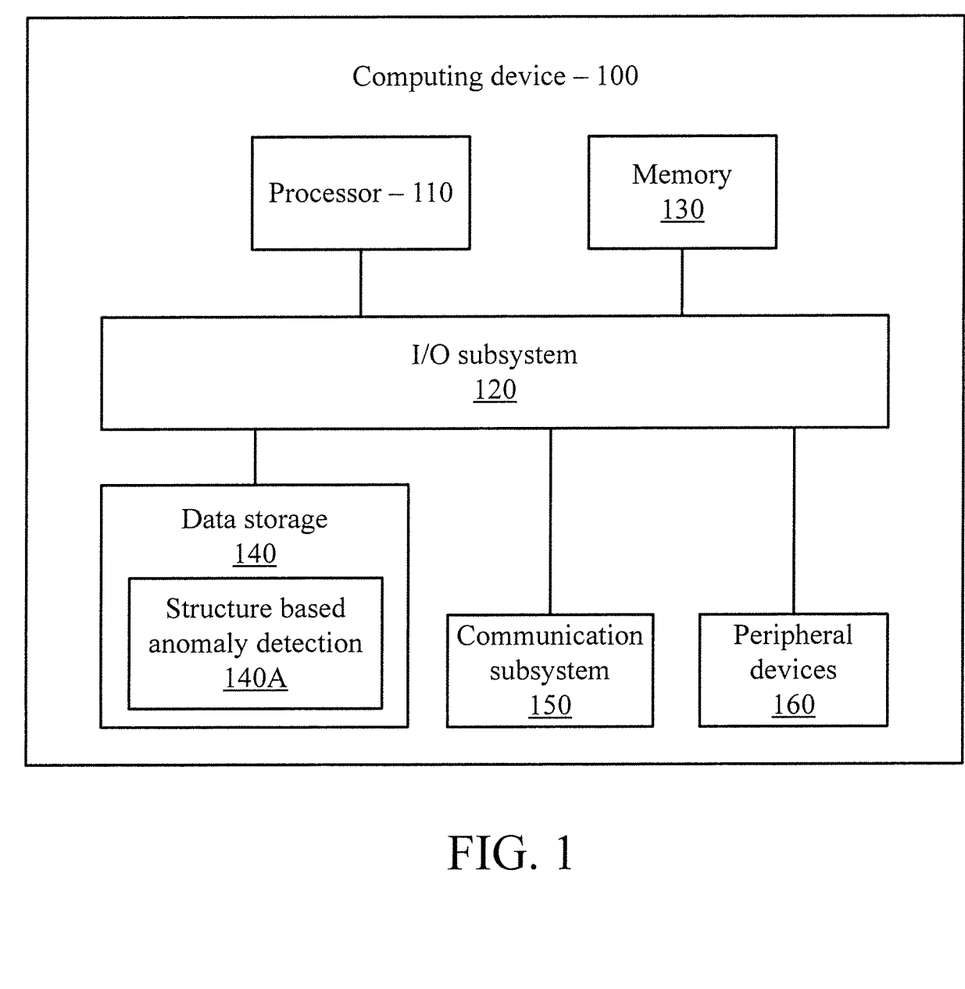
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to perform structure based anomaly detection.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for structure based anomaly detection. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
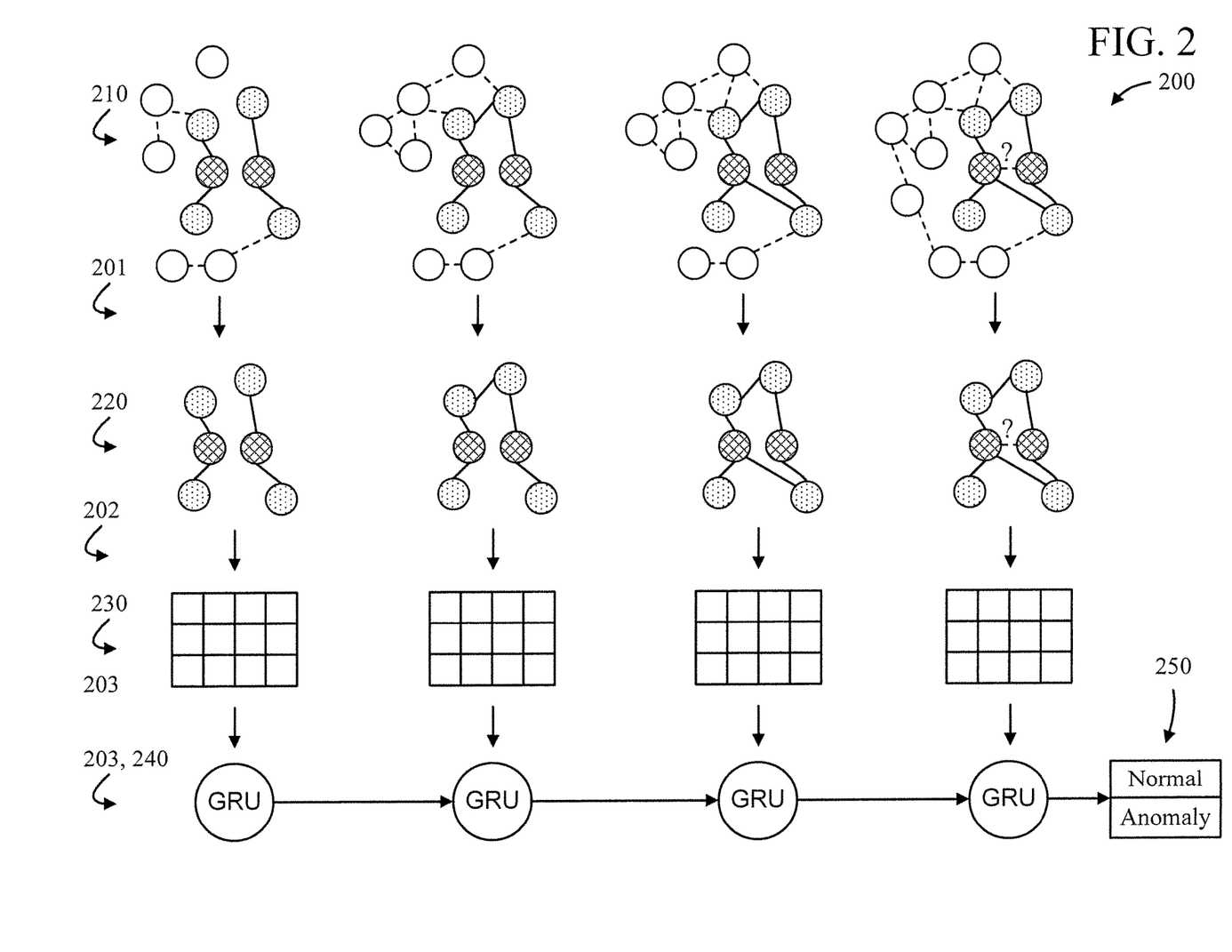
FIG. 2 is a block diagram showing an exemplary anomalous edge detection framework, in accordance with an embodiment of the present invention.

These and other variations of a hardware processor subsystem are also contemplated in accordance with embodiments of the present invention FIG. 2 is a block diagram showing an exemplary anomalous edge detection framework 200, in accordance with an embodiment of the present invention.

The anomalous edge detection framework 200 includes the following three components: a subgraph structure generator 201; a graph structure feature extraction network 202; and a detection network 203.

The first step involving the framework 200 relative to original graphs 210 is to generate the structure graph for the target edge to be detected in a time window with a length w. Since the detection is most relevant to the local subgraph, h-hop enclosing subgraphs 220 centered on each target edge are employed to enable the computation to be more efficient. In addition, the h-hop enclosing subgraphs can help alleviate the effects of noisy data.

The subgraph structure generator 201 can generate an enclosing subgraph for each timestamp in the detection window. The graph structure feature extraction network 202 takes these subgraphs as input and generates fixed-size features 230 for each graph.

Since the anomalous edges are determined by considering the historical graphs, recurrent neural networks (e.g., gated recurrent unit (GRU)) 240 are employed to capture the temporal information. The recurrent neural networks 240 take the graph structure feature from the current timestamp and temporal feature from the previous timestamp as input and generates the temporal feature. The temporal feature from the last timestamp is employed to predict anomalous edges 250 using the recurrent neural networks 240.

Figure 3:
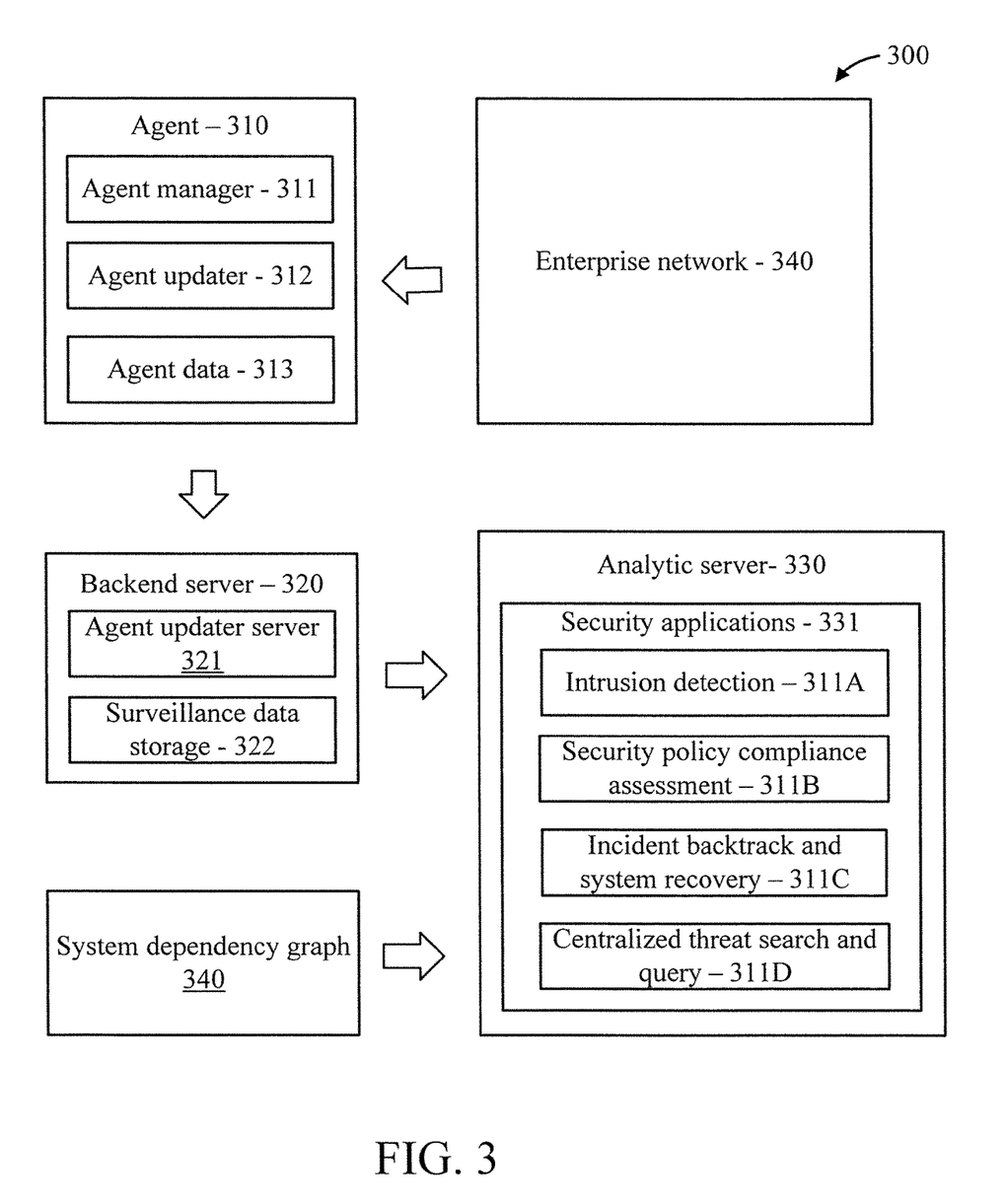
FIG. 3 is a block diagram showing an exemplary automatic security intelligence system architecture, in accordance with an embodiment of the present invention.

FIG. 3 is a block diagram showing an exemplary automatic security intelligence system architecture 300, in accordance with an embodiment of the present invention.

The automatic security intelligence system architecture 300 includes the following three primary components: (1) an agent 310; (2) a backend server 320; (3) the analytics server 330.

The agent 310 is installed in each machine of an enterprise network 340 to collect operational data. The agent 310 includes an agent manager 311, an agent updated 312, and agent data 313. In an embodiment, the agent data can include, for example, an active process, a file access, a network socket, an IPC, and host information. The enterprise network 340 can include tens, hundreds, and/or thousands of elements, for example, to be monitored for anomalies.

The backend server 320 receives the data from agents, pre-process the data and sends the pre-processed data to an analytics server 330. The backend server 320 includes an agent updated server 321 and a surveillance data store 322.

The analytics server 330 runs the security application programs to analyze the data. The analytic server 330 includes security applications 331 that include intrusion detection 331A, security policy compliance assessment 331B, incident backtrack and system recovery 331C, and centralized threat search and query 331D.

The system dependency graph 340 automatically and incrementally constructs a system blueprint (modeling) with confidence to holistically profile the whole system under anomaly detection consideration. It is essential to many forensic analysis (analytic reasoning) applications, such as intrusion detection, incident backtrack & system recovery etc. In an embodiment, the technique of the present invention can be integrated in an intrusion detection engine.

The system dependency graph 340 is obtained by modeling the enterprise network 340. Analytic reasoning is applied to the graph 340 by the analytics server 330.

Figure 4:
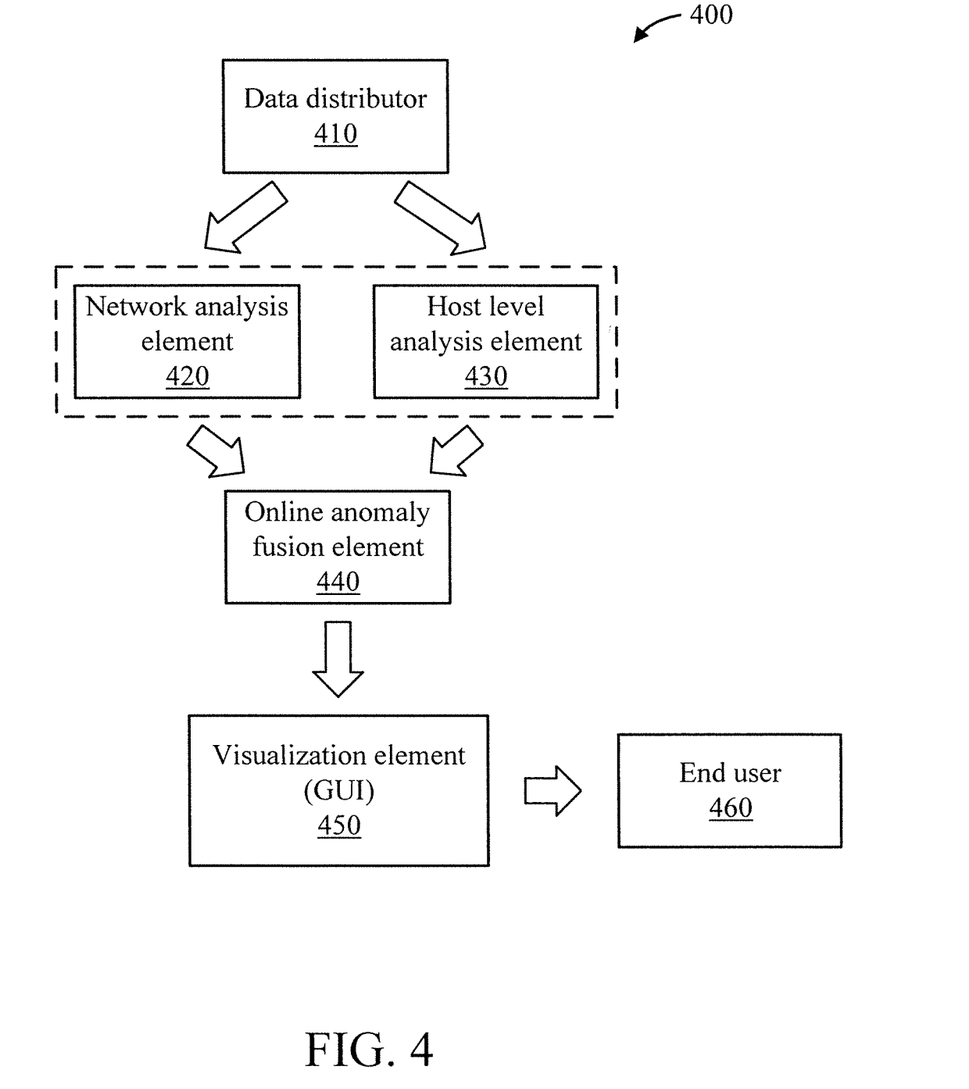
FIG. 4 is a block diagram showing an exemplary intrusion detection engine architecture, in accordance with an embodiment of the present invention.

FIG. 4 is a block diagram showing an exemplary intrusion detection engine architecture 400, in accordance with an embodiment of the present invention.

In an embodiment, the intrusion detection engine architecture 400 can include the following five elements: (1) a data distributor 410; (2) a network analysis element 420; (3) a host level analysis element 430; (4) an anomaly fusion element 440; and (5) a visualization element 450.

The data distributor 410 receives the data from the backend server and distributes the corresponding data to network or host level elements.

The network analysis element 420 processes the network connection events (including Transmission Control Protocol (TCP) and User Datagram Protocol (UDP) and detects the abnormal connections.

The host level analysis element 430 processes the host level events, including user-to-process, process-to-file, user-to-registry, etc. The abnormal host level events are generated.

The anomaly fusion element 440 integrates the network and host level anomalies and refines the results for trustworthy intrusion events.

The visualization element 450 outputs the detection results to end users 460. The technique of the present invention can be part of network analysis element 420 and host level analysis element 430 for detecting the malicious events in both network and host levels.

Network Event. A network event can be defined as a multiple-tuple. More specifically, a seven-tuple is used as follows to represent a network event: <src-ip; src-port; dst-port; connecting-process; protocol-num; and timestamp>; where src-ip and src-port are the IP address and port of the source host, and dst-ip and dst-port are the IP and port of the destination host. The connecting-process is the process that initializes the connection, protocol-num indicates the protocol of the connection, and timestamp records the connection time.

Process (Host)-level Event. A process-level event can also be defined as a multiple-tuple. More specifically, a five-tuple is used as follows to represent the process-level event: <host-id; user-id; process; object; and timestamp>; where host-id indicates the host where the agent is installed, user-id identifies the user who runs the process, timestamp records the event time, process is the subject of the event, and object is the object of the event. The object can be a file, another process, or a socket that includes the connection information. According to the object type, the process-level events can be further classified into three categories: the process-file events, the process-socket events, and the process-process events.

A description will now be given regarding dependency graph construction, in accordance with an embodiment of the present invention.

A dependency graph at a time stamp t is formally defined as an undirected weighted graph $G_t=\{V, E\}$, where $V=\{v_1, \ldots, v_n\}$ is the set of n heterogeneous system entities and $E=\{e_1, \ldots, e_m\}$ is the set of m edges between pairs of entities. The edges exist depending on whether there are invariant or dependency relationships between the corresponding pairs of system entities.

For example, in an enterprise security system, a dependency graph/network is a graph between different computer system entities such as processes, files, and Internet sockets. The edges indicate the stable causal dependencies including a process accessing a file, a process forking another process, and a process connecting to an Internet socket.

Depending on the type of the collected system data, there are different ways to generate the invariant relationships/edges. For the time series data (e.g., sensor readings from a cyber-physical system), given two pairs of time series x(t) and y(t), where t is the timestamp, the relationship between x(t) and y(t) can be constructed by using the AutoRegressive eXogenous (ARX) model. For the categorical event data (e.g., the process events from an enterprise system), a common system event can be presented as an edge between two nodes, each representing the initiator or the target of the interaction.

A description will now be given regarding subgraph structure extraction, in accordance with an embodiment of the present invention.

In graph-related tasks, the whole graph is directly employed for analysis. In some specific applications, using a sub-graph instead of the whole graph enables the analysis procedure to be more efficient. For instance, using a sub-graph is more efficient for learning the embedding of the isolated sub-graph in the whole graph. It has also been proven that in graph neural networks, each node is most influenced by its neighbors. Therefore, in anomalous edge detection tasks, the sub-graph structure centered on the target edge can be employed to detect anomaly more efficiently both in memory and computation aspects. This is because by extracting the sub-graph structure, only a small set of most relevant nodes are considered in the anomalous edge detection procedure, instead of directly employing the whole graph for analysis, which is highly computational expensive, especially considering the real-world networks with thousands or even millions of nodes and edges.

Definition 1. (Enclosing subgraph in static graphs) For a static network G=(V, E), given a target edge e with source node x and destination node y, the h-hop enclosing subgraph $G_{x,y}^h$ centered on edge e can be obtained by $\{i|d(i,x)\le h \vee d(i,y)\le h\}$, where d(i,x) is the shortest path distance between node i and node x.

Definition 2. (Enclosing subgraph in dynamic graphs) For a temporal network $\{\{G(i)=\{V(i),E(i)\}\}_{i=t-w}^t$ with window size w, given a target edge $e^t$ with source node $x^t$ and destination node $y^t$, the h-hop enclosing subgraph $G_{x,y}^h$ centered on edge $e^t$ is collection of all sub-graph centered on $e^t$ in the temporal network $\{G_{x,y}^h | t-w \le i \le t\}$.

When detecting an edge $e^t$, the enclosing subgraph can be extracted from the dynamic graphs based on Definition 2. The subgraph from each timestamp is extracted centered the target edge, thus representing the structure changing along the timestamps. The category of the target edge can be determined by analyzing the structure change in the given time stamps. However, the extracted subgraph only includes topology information. Sub-graphs extracted bases on different edges can result in the same topology structure. Therefore, nodes in the sub-graph must be annotated with different labels that can represent the role of a node in the sub-graph.

The goal of node labeling is to indicate the role of each node in the sub-graph. Therefore, the node labeling function should convey the following information: (1) which edge is the target edge in the current subgraph; and (2) the contribution of each node to identify the category of each edge. Herein, a node labeling function is employed. Given the edge $e^t$ and the corresponding source and destination node $x^t$ and $y^t$, the node labeling function for the enclosing subgraph $G_{x,y}^h$ can be represented as follows:

$$f(i, x_t, y_t) = 1 + \min(d(i, x^t), d(i, y^t)) + \left(\frac{d_{sum}}{2}\right)\left[\frac{d_{sum}}{2}\right] + (d_{sum}\%2) - 1] \quad (1)$$

where $d(i,x^t)$ is the Euclidean distance between node i and node $x^t$, and $d_{sum}=d(i,x^t)+d(i,y^t)$. In addition, the two center nodes are labeled with 1. If a node i satisfies $d(i, x^t)=\infty$ or $d(i,^t)=\infty$, then it will be labeled as 0. The label will be converted into a one-hot vector as the attribute X for each node. By employing the node labeling function, the label can be generated for each node, which can represent structure information for the given subgraph. The category of the target edge $e^t$ at timestamp t can be predicted by analyzing the labeled subgraph in the given timestamp window.

To analyze the structure of each enclosing sub-graph from the given timestamp period, the graph convolution neural network can be employed to project the graph into an embedding space. The graph convolution layer is proposed to learn the embedding of each node in the graph and aggregate the embedding from its neighbors. The layer-wise forward operation of graph convolution layer can be described as follows:

$$G(X,A)=\sigma(\hat{D}^{-1/2}\hat{A}\hat{D}^{-1/2}XW) \quad (2)$$

where $\hat{A}=A+1$ is the summation of the adjacency matrix and identity matrix, and W is the embedding matrix. By employing the graph convolution layer, each node can aggregate the embedding from its neighbors. By stacking the graph convolution layer in the neural network, each node can obtain more information from other nodes. For example, each node can obtain information from its 2-hop neighbors by stacking two graph convolution layers.

The graph convolution neural network can provide embedding for each node in the graph to detect anomalous edges. However, in dynamic graph anomaly detection, the anomalous edge must be determined in the context of $\{G_{x,y}^h | t-w \leq i \leq t\}$. The number of nodes in each graph $G(i)_{x_t,y_t}^h$ is commonly different, thus results in the different size of the feature vector in each graph. Therefore, it is challenging to analyze the anomalous using neural networks due to the various size of the input. To tackle this problem, graph pooling technology is employed to extract the fixed-size feature for each graph.

In the proposed framework for anomalous edge detection in dynamic graphs, any graph pooling method can be employed to extract the fixed-size feature for further analysis. Here, a Sortpooling layer is used, which can sort the feature of the node in the graph based on its importance and select the feature from top K nodes.

Given the node embedding $H_i$ correspond to graph $G(i)_{x_t,y_t}^y$, the importance score for each node in the Sortpooling layer is defined as follows:

$$S(H_i, A) = \sigma\left(\hat{D}^{-\frac{1}{2}} \hat{A} \hat{D}^{-\frac{1}{2}} H_i W^1\right) \quad (3)$$

where A is the adjacency matrix of graph $G(i)_{x_t,y_t}$, and $W^1$ is the projection matrix with output channel 1. Each node can obtain the importance score by using Equation 3. All nodes in the graph will also be sorted in order of the importance sore. And only top K nodes will be selected for further analysis. In terms of graphs that include less than K nodes, the zero padding will be employed to guarantee that each graph includes the fixed-size feature.

A description will now be given regarding the temporal detection network, in accordance with an embodiment of the present invention.

The graph structural feature extraction network can generate promising features for analyzing the category of target edge $e^t$. However, the temporal information is of great importance for determining the category of an edge since it must be predicted based on the context graph in the dynamic setting. Given the extracted structural feature $\{H_t\}_{i=t-w}^t$, $H_t \in R^{K \times d}$, where K is the number of selected nodes in each graph, and d is the dimension of feature for each node.

Herein, a gated recurrent unit (GRU) is employed which can alleviate the vanishing and exploding gradient problems to capture the temporal information as:

$$z_t = \sigma(W_z \hat{H}_t + U_z h_{t-1} + b_z) \quad (1)$$

$$r_t = \sigma(W_r \hat{H}_t + U_r h_{t-1} + b_r) \quad (2)$$

$$h_t' = \tan h(W_h \hat{H}_t + U_h(r_t \cdot h_{t-1}) + b_h) \quad (3)$$

$$h_t = z_t \cdot h_{t-1} + (1-z_t) \cdot h_t' \quad (4)$$

where · represents the element-wise product operation, W, U, and b are parameters. The GRU network takes the feature at each timestamp as input, and feeds the output of the current timestamp into the next timestamp. Therefore, the temporal information can be modeled by the GRU network. The output of last timestamp $h_t$ is employed to analyze the category of the target edge $e^t$. The anomalous edge detection problem can be formulated as follows:

$$L = -(y^t \log(g(h_t)) + (1-y^t)\log(1-g(h_t))) \quad (5)$$

where $g(\cdot)$ is a fully connected network, and $y^t$ is the category of edge $e^t$.

In addition, the proposed framework method is flexible and easily customized. Any network that can capture the temporal dependency can be used in the proposed framework, such as convolution neural networks (CNNs) and recurrent neural networks (RNNs).

A description will now be given regarding end-to-end learning, in accordance with an embodiment of the present invention.

In accordance with embodiments of the present invention, the anomalous edge detection problem is formulated as a classification problem. However, in most cases, the dataset does not include anomaly in the dataset. In accordance with an embodiment of the present invention, an anomaly injection method is proposed for creating the anomalous edges and training the network.

Figure 5:
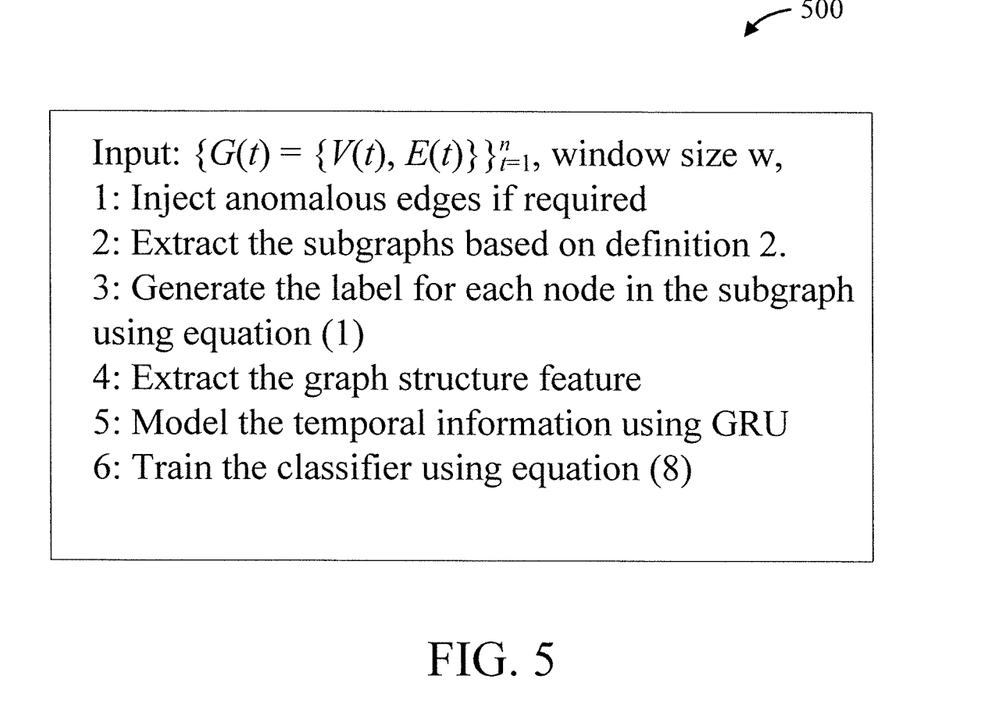
FIG. 5 is a block diagram showing exemplary pseudocode for anomaly detection in dynamic graphs, in accordance with an embodiment of the present invention.

FIG. 5 is a block diagram showing exemplary pseudocode 500 for anomaly detection in dynamic graphs, in accordance with an embodiment of the present invention.

Figure 6:
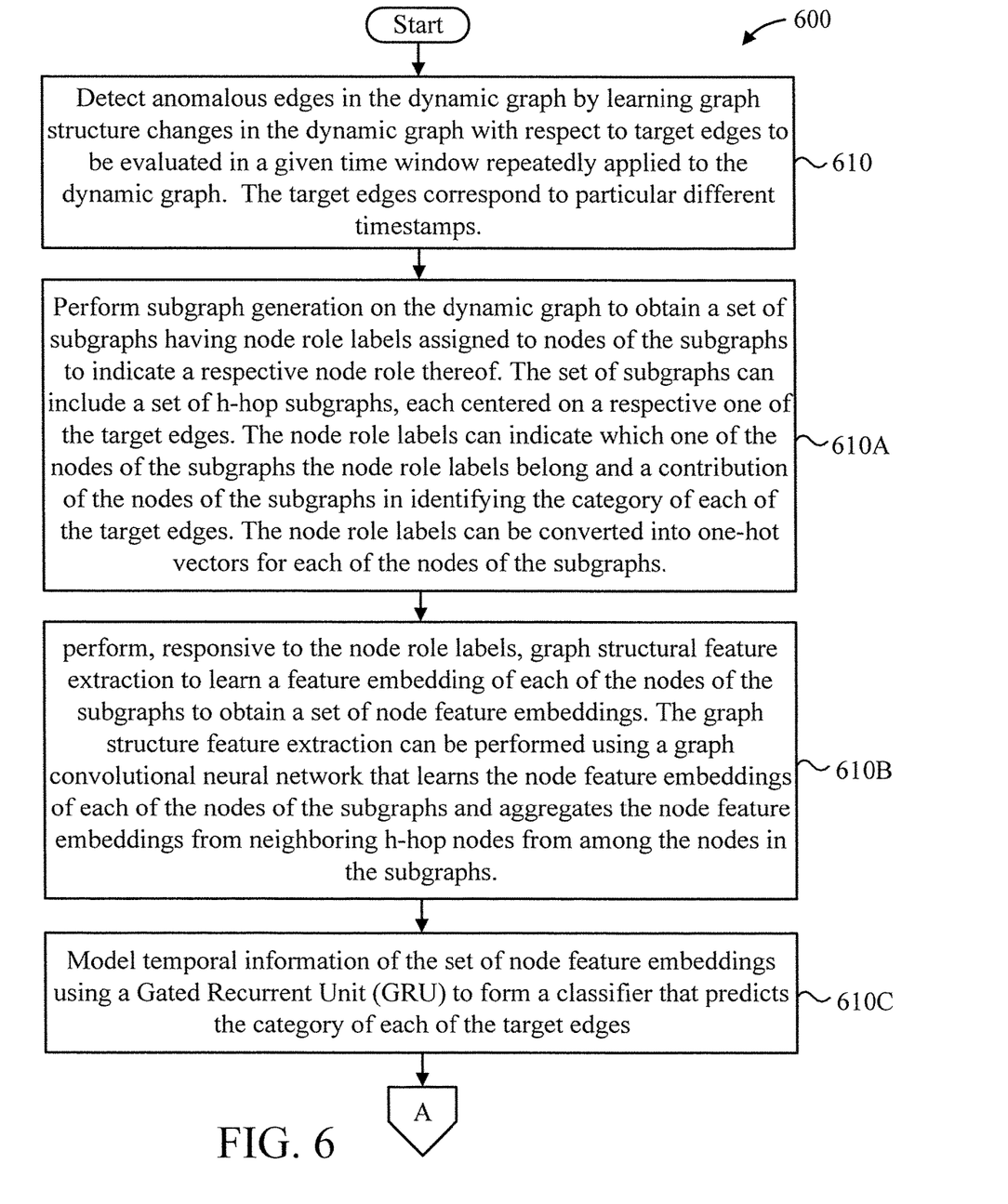
FIGS. 6-7 are flow diagrams showing an exemplary method for structure based anomaly detection, in accordance with an embodiment of the present invention.
Figure 7:
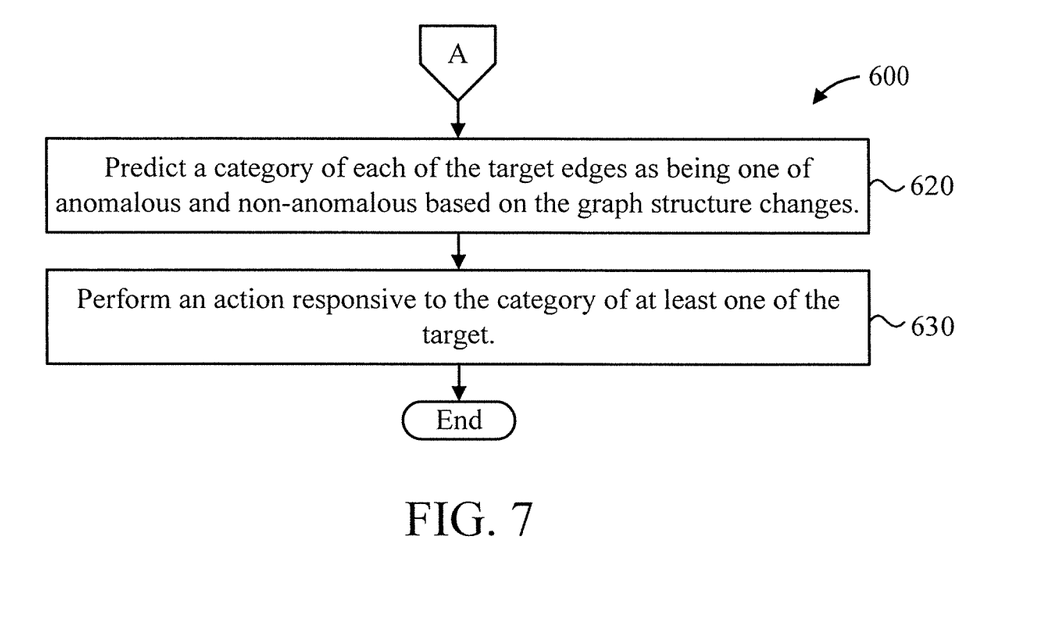

FIGS. 6-7 are flow diagrams showing an exemplary method 600 for structure based anomaly detection, in accordance with an embodiment of the present invention.

At block 610, detect anomalous edges in the dynamic graph by learning graph structure changes in the dynamic graph with respect to target edges to be evaluated in a given time window repeatedly applied to the dynamic graph. The target edges correspond to particular different timestamps.

In an embodiment, block 610 can include one or more of blocks 610A through 610C.

At block 610A, perform subgraph generation on the dynamic graph to obtain a set of subgraphs having node role labels assigned to nodes of the subgraphs to indicate a respective node role thereof. In an embodiment, the set of subgraphs can include a set of h-hop subgraphs, each centered on a respective one of the target edges. In an embodiment, the node role labels can indicate which one of the nodes of the subgraphs the node role labels belong and a contribution of the nodes of the subgraphs in identifying the category of each of the target edges. In an embodiment, the node role labels can be converted into one-hot vectors for each of the nodes of the subgraphs.

At block 610B, perform, responsive to the node role labels, graph structural feature extraction to learn a feature embedding of each of the nodes of the subgraphs to obtain a set of node feature embeddings. In an embodiment, the graph structure feature extraction can be performed using a graph convolutional neural network that learns the node feature embeddings of each of the nodes of the subgraphs and aggregates the node feature embeddings from neighboring h-hop nodes from among the nodes in the subgraphs.

At block 610C, model temporal information of the set of node feature embeddings using a Gated Recurrent Unit (GRU) to form a classifier that predicts the category of each of the target edges.

At block 620, predict a category of each of the target edges as being one of anomalous and non-anomalous based on the graph structure changes.

At block 630, perform an action responsive to the category of at least one of the target. For example, control a hardware based device to avoid an impending failure responsive to the category of at least one of the target edges.

Exemplary actions can include, for example, but are not limited to, recognizing anomalies in computer processing systems and controlling the system in which an anomaly is detected. For example, a query in the form of time series data from a hardware sensor or sensor network (e.g., mesh) can be characterized as anomalous behavior (dangerous or otherwise too high operating speed (e.g., motor, gear junction), dangerous or otherwise excessive operating heat (e.g., motor, gear junction), dangerous or otherwise out of tolerance alignment (e.g., motor, gear junction, etc.) using a text message as a label. In a processing pipeline, an initial input time series can be processed into multiple text messages and then recombined to include a subset of the text messages for a more focused resultant output time series with respect to a given topic (e.g., anomaly type). Accordingly, a device may be turned off, its operating speed reduced, an alignment (e.g., hardware-based) procedure is performed, and so forth, based on the implementation.

Another exemplary action can be operating parameter tracing where a history of the parameters change over time can be logged as used to perform other functions such as hardware machine control functions including turning on or off, slowing down, speeding up, positionally adjusting, and so forth upon the detection of a given operation state equated to a given output time series and/or text comment relative to historical data.

Exemplary environments where the present invention can be deployed include, but are not limited to, power plants, information technology systems, manufacturing plants, and so forth. These and other environments are readily contemplated by one of ordinary skill in the art, given the teachings of the present invention provided herein.

Figure 8:
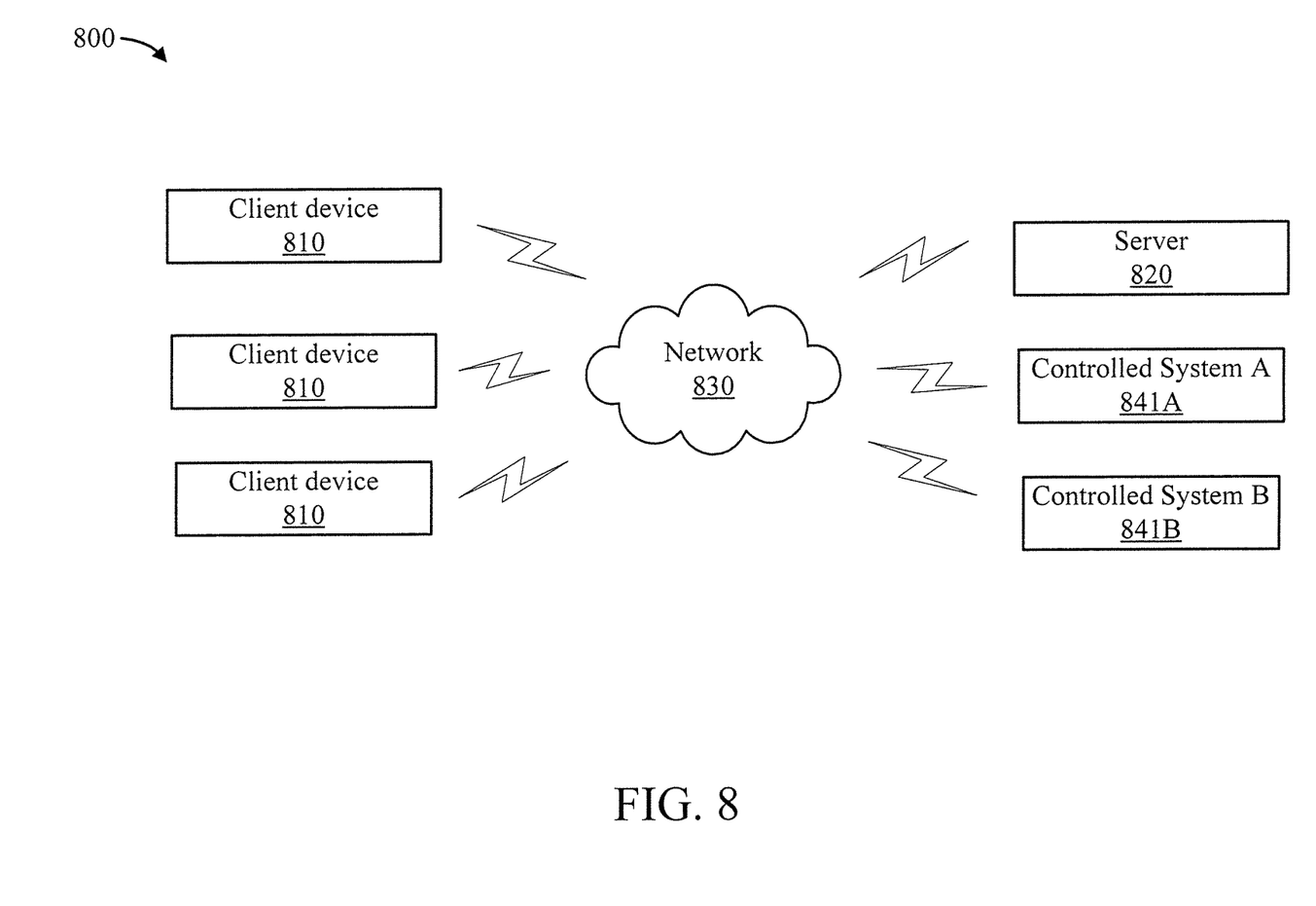
FIG. 8 is a block diagram showing an exemplary computing environment, in accordance with an embodiment of the present invention.

FIG. 8 is a block diagram showing an exemplary computing environment 800, in accordance with an embodiment of the present invention.

The environment 800 includes a server 810, multiple client devices (collectively denoted by the figure reference numeral 820), a controlled system A 841, a controlled system B 842.

Communication between the entities of environment 800 can be performed over one or more networks 830. For the sake of illustration, a wireless network 830 is shown. In other embodiments, any of wired, wireless, and/or a combination thereof can be used to facilitate communication between the entities.

The server 810 receives dynamic graphs from client devices 820. The server 810 may control one of the systems 841 and/or 842 based on a prediction generated from a model generated by the dynamic graphs. In an embodiment, the dynamic graphs can relate to time series data that, in turn, relates to the controlled systems 841 and/or 842 such as, for example, but not limited to sensor data.

A description will now be given regarding supervised training, in accordance with an embodiment of the present invention.

The supervised training involves sampling normal and anomaly edges, extracting enclosing subgraphs and fixed size structure features, modeling the extracted features in the time dimension, and solving the anomaly detection as a classification problem.

A description will now be given regarding unsupervised training, in accordance with an embodiment of the present invention.

The unsupervised training involves sampling normal and anomaly edges, extracting enclosing subgraphs and fixed size structure features, modeling the extracted features in the time dimension, and solving the anomaly detection as a reconstruction problem.

A description will now be given regarding some of the many attendant advantages of the present invention.

The present invention can detect anomalies more efficiently than the prior art in both memory and computation aspects.

The present invention can detect anomalous edges in two types of dynamic graphs, namely historical graphs and time-evolving graphs.

The present invention provides improved performance over the prior art with less false positives and false negatives.

The present invention is able to detect "zero-day" and "real-time" attacks.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for graph structure based anomaly detection on a dynamic graph, comprising:
    detecting anomalous edges in the dynamic graph by learning graph structure changes in the dynamic graph with respect to target edges to be evaluated in a given time window repeatedly applied to the dynamic graph, the target edges corresponding to particular different timestamps;
    predicting a category of each of the target edges as being one of anomalous and non-anomalous based on the graph structure changes; and
    controlling a hardware based device to avoid an impending failure responsive to the category of at least one of the target edges,
    wherein said detecting step comprises performing subgraph generation on the dynamic graph to obtain a set of subgraphs having node role labels assigned to nodes of the subgraphs to indicate a respective node role thereof, and performing, responsive to the node role labels, graph structural feature extraction to learn a feature embedding of each of the nodes of the subgraphs to obtain a set of node feature embeddings, wherein the graph structure feature extraction is performed using a graph convolutional neural network that learns the node feature embeddings of each of the nodes of the subgraphs and aggregates the node feature embeddings from neighboring h-hop nodes from among the nodes in the subgraphs, and wherein an aggregation of the node feature embeddings is used to predict the category of each of the target edges in said predicting step.

2. The computer-implemented method of claim 1, wherein said detecting step further comprises modeling temporal information of the set of node feature embeddings using a Gated Recurrent Unit (GRU) to form a classifier that predicts the category of each of the target edges.

3. The computer-implemented method of claim 1, wherein the set of subgraphs comprise a set of h-hop subgraphs, each of the h-hop subgraphs being centered on a respective one of the target edges.

4. The computer-implemented method of claim 1, wherein the node role labels represent structure information for the nodes in the subgraphs.

5. The computer-implemented method of claim 1, wherein the node role labels indicate which one of the nodes of the subgraphs the node role labels belong and also indicate a contribution of the nodes of the subgraphs in identifying the category of each of the target edges.

6. The computer-implemented method of claim 5, wherein the node role labels are converted into one-hot vectors for each of the nodes of the subgraphs.

7. The computer-implemented method of claim 1, further comprising fixing a feature size of features extracted from the subgraphs based on a feature importance in determining the category of each of the target edges.

8. The computer-implemented method of claim 1, wherein the dynamic graph is a historical dynamic graph comprising historical data values up to a current timestamp, and wherein the method furthering comprising capturing, using one or more recurrent neural networks, temporal features from the historical data values, the temporal features used to predict the category of each of the target edges.

9. The computer-implemented method of claim 1, wherein the method furthering comprises inputting a graph structure feature from a current timestamp and temporal feature from a previous timestamp into a current neural network to generate a temporal feature for a given one of the target edges.

10. The computer-implemented method of claim 1, wherein the dynamic graph is a time-evolving dynamic graph comprising time-evolving data values for a current timestamp.

11. The computer-implemented method of claim 1, wherein said detecting step detects unusual subgraph structures in the time window in consideration of temporal dependency.

12. The computer-implemented method of claim 1, wherein the category of anomalous represents a network attack.

13. A computer program product for graph structure based anomaly detection on a dynamic graph, the computer program product comprising a non-transitory computer readable storage medium having program instructions embodied therewith, the program instructions executable by a computer to cause the computer to perform a method comprising:
    detecting anomalous edges in the dynamic graph by learning graph structure changes in the dynamic graph with respect to target edges to be evaluated in a given time window repeatedly applied to the dynamic graph, the target edges corresponding to particular different timestamps;
    predicting a category of each of the target edges as being one of anomalous and non-anomalous based on the graph structure changes; and controlling a hardware based device to avoid an impending failure responsive to the category of at least one of the target edges,
wherein said detecting step comprises performing subgraph generation on the dynamic graph to obtain a set of subgraphs having node role labels assigned to nodes of the subgraphs to indicate a respective node role thereof, and performing, responsive to the node role labels, graph structural feature extraction to learn a feature embedding of each of the nodes of the subgraphs to obtain a set of node feature embeddings, wherein the graph structure feature extraction is performed using a graph convolutional neural network that learns the node feature embeddings of each of the nodes of the subgraphs and aggregates the node feature embeddings from neighboring h-hop nodes from among the nodes in the subgraphs, and wherein an aggregation of the node feature embeddings is used to predict the category of each of the target edges in said predicting step.

14. The computer program product of claim 13, wherein said detecting step further comprises modeling temporal information of the set of node feature embeddings using a Gated Recurrent Unit (GRU) to form a classifier that predicts the category of each of the target edges.

15. The computer program product of claim 13, wherein the set of subgraphs comprise a set of h-hop subgraphs, each of the h-hop subgraphs being centered on a respective one of the target edges.

16. A computer processing system for graph structure based anomaly detection on a dynamic graph, comprising:

a memory configured to store program code; and
a hardware processor operatively coupled to the memory for running the program code to:
  detect anomalous edges in the dynamic graph by learning graph structure changes in the dynamic graph with respect to target edges to be evaluated in a given time window repeatedly applied to the dynamic graph, the target edges corresponding to particular different timestamps;
  predict a category of each of the target edges as being one of anomalous and non-anomalous based on the graph structure changes; and
  control a hardware based device to avoid an impending failure responsive to the category of at least one of the target edges,
wherein detecting the anomalous edges comprises performing subgraph generation on the dynamic graph to obtain a set of subgraphs having node role labels assigned to nodes of the subgraphs to indicate a respective node role thereof, and performing, responsive to the node role labels, graph structural feature extraction to learn a feature embedding of each of the nodes of the subgraphs to obtain a set of node feature embeddings, wherein the graph structure feature extraction is performed using a graph convolutional neural network that learns the node feature embeddings of each of the nodes of the subgraphs and aggregates the node feature embeddings from neighboring h-hop nodes from among the nodes in the subgraphs, and wherein an aggregation of the node feature embeddings is used to predict the category of each of the target edges in said predicting step.

* * * * *